United States Patent
Almen et al.

(10) Patent No.: US 9,575,558 B2
(45) Date of Patent: Feb. 21, 2017

(54) SYSTEM AND METHOD FOR ELECTRONICALLY ASSISTING A CUSTOMER AT A PRODUCT RETAIL LOCATION

(75) Inventors: Kevin D. Almen, Albany, OR (US); Ronald Tippetts, Corvallis, OR (US); Phillip S. Burkum, Corvallis, OR (US); David P. Markel, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1907 days.

(21) Appl. No.: 12/250,974

(22) Filed: Oct. 14, 2008

(65) Prior Publication Data

US 2010/0094681 A1  Apr. 15, 2010

Related U.S. Application Data

(60) Provisional application No. 60/992,536, filed on Dec. 5, 2007.

(51) Int. Cl.
- G06Q 30/00  (2012.01)
- G06F 3/048  (2013.01)
- G06F 3/01   (2006.01)
- G06Q 30/02  (2012.01)

(52) U.S. Cl.
CPC ............. *G06F 3/013* (2013.01); *G06Q 30/02* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 7,225,414 B1* | 5/2007 | Sharma | G06F 3/012 715/862 |
| 2005/0198661 A1* | 9/2005 | Collins | G09F 27/00 725/19 |
| 2006/0074769 A1* | 4/2006 | Looney | G06Q 30/02 705/14.66 |
| 2006/0256133 A1 | 11/2006 | Rosenberg | |
| 2007/0024580 A1 | 2/2007 | Sands et al. | |
| 2008/0091497 A1* | 4/2008 | Julien | G06Q 10/0631 705/7.12 |
| 2008/0249870 A1* | 10/2008 | Angell | G06Q 30/02 705/14.53 |

OTHER PUBLICATIONS

Dumais, S., et al.; SIGIR 2003 Workshop Report: Implicit Measures of User Interests and Preferences; SIGIR 2003 conference; pp. 1-5.*
Tobii Eye Tracking: See through the eyes of the user. "Measure true user experience."

* cited by examiner

*Primary Examiner* — Matthew Gart
*Assistant Examiner* — Ashley Y Young
(74) *Attorney, Agent, or Firm* — HP Patent Department

(57) ABSTRACT

A method is disclosed for electronically assisting a customer through a buying cycle at a product retail location having a product oriented display. The method includes sensing an amount of time the customer is interested in the display. Another operation is determining the customer's stage in a product buying cycle based on the amount of time the customer is interested in the display and displaying product detail based on the customer's stage in the buying cycle. The display can be changed to a subsequent stage in the buying cycle having more time and interaction between the customer and the display.

21 Claims, 5 Drawing Sheets

SYSTEM AND METHOD FOR ELECTRONICALLY ASSISTING A CUSTOMER AT A PRODUCT RETAIL LOCATION

CROSS REFERENCE TO RELATED APPLICATIONS

This Application claims the benefit of U.S. Provisional Application Ser. No. 60/992,536, filed Dec. 5 2007, titled "System And Method For Electronically Assisting A Customer At A Product Retail Location" which is hereby incorporated by reference herein as if reproduced in full below.

BACKGROUND

Up to 70% of a customer's purchase decision is made in the sales aisles at retail locations. With the increased complexity of product technology and the greater variety of product choices that are available, the ability to capture a customer's attention at a retail location is becoming more important.

Prior solutions for helping customers decide which products to buy include human assisted sales, static signage at the shelf, and dynamic signage at an aisle's end. Human assisted sales are impractical and expensive on a per product level. Many sales associates are too busy to help customers in a timely manner, unable to answer key questions or are too pushy. However, relevant product information tailored to a customer's needs is essential to closing a sale with a customer.

Printed signage is static and forces a choice between attracting a customer's attention and informing the customer on a product. Printed billboards, light box posters and signs, electronic signs and monitors, and retail store window displays, are rapidly growing areas of marketing investment. On the other hand, dynamic signage has a much greater ability to attract consumers than static signage. It is well known that motion and a change of colors and shapes has a much greater ability to attract consumers than static content. In order to increase sales of products, retailers and brands desire to provide advertising at the product shelf level quickly followed by more in depth product information.

DETAILED DESCRIPTION OF EXAMPLE EMBODIMENTS

In describing embodiments of the present invention, the following terminology will be used.

The singular forms "a," "an," and "the" include plural referents unless the context clearly dictates otherwise. Thus, for example, reference to "a device" includes reference to one or more of such devices.

As used herein, dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art.

Reference will now be made to the exemplary embodiments illustrated, and specific language will be used herein to describe the same. It will nevertheless be understood that no limitation of the scope of the invention is thereby intended.

A system and a method are provided to dynamically update the level of product information that is displayed about a product to a greater level of detail, the longer the system senses a customer in front of the shelf. The disclosed system matches the level of content detail with the time a consumer is present in front of the shelf and his interest in the shelf display. Facial recognition techniques that identify a customer may also be used to determine customer interest. Customer proximity to a display and eye contact may be used as indicators of a customer's interest. Additionally, the system is capable of integrating spatial indicators such as geographical and regional indicators to aid a customer in making a purchase decision.

One benefit of the disclosure is that a customer may be electronically assisted in a product purchase. In one embodiment, the disclosed device and system may interact with the customer based solely on the time a customer is present at a display. The interaction may occur in the form of greater displayed detail concerning an advertised product. There are options disclosed for active participation but such options do not necessarily have to be activated for an update of the display. Therefore a passive customer may be assisted in his purchase decision as well as the active customer who may choose to actively participate and interact with a display.

This passive interactive feature is also beneficial when multiple customers are present at a display and are not all able to actively interact with the display at one time. Customers eavesdropping on an interactive session between another customer and a display may also be assisted in making a purchasing decision. Should the first customer leave the display, the device and system may sense that at least one customer is still present at the display and continue to display product information without restarting the display at the beginning of a buying cycle.

Figure 1:
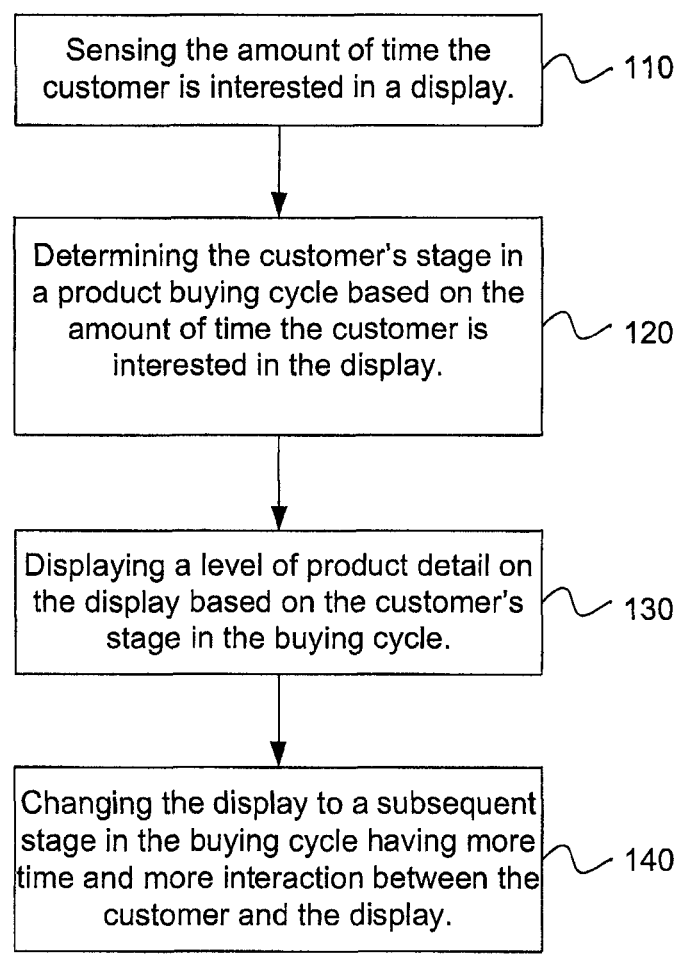
FIG. 1 depicts a method for electronically assisting a customer at a product retail location having a product oriented display in accordance with an embodiment.

FIG. 1 depicts a method for electronically assisting a customer at a product retail location having a product oriented display. A display may be dynamic electronic signage, static electronic signage or static non-electronic signage or any combination thereof. An amount of time the customer is interested in a display can be sensed, as in block 110. The amount of time a customer spends at a display may indicate the customer's interest in the display. Sensing techniques may include facial recognition, eye movement and gaze duration, proximity detection, card swiping, and screen touching to determine customer interest.

The customer's stage in a product buying cycle can be determined based on the amount of time the customer is interested in the display, as in block 120. A buying cycle for instance may start with getting a customer's attention, giving the customer information about a displayed product and influencing a customer to make a purchasing decision.

A level of product detail can be shown on the display based on the customer's stage in the buying cycle as in block 130. The customer's stage in the buying cycle can be determined by the amount of time the customer spends at the display. Product detail displayed may include product specifications such as product features, size, price, and availability. Also spatial indicators may be integrated into a display. For example, the display locations of products available for sale may help a customer locate products without having to track down a human sales associate.

The display can then be changed to a subsequent stage in the buying cycle which provides increased time and interaction between the customer and the display, as in block 140. The more customers interact with a display and the more time they spend at a display, the more likely they are to make a purchase decision. Therefore, the longer a customer is interested in a display, the more product detail is made available to him or her through interaction with the display. In other words, product detail can be provided as the display progresses through subsequent stages in a product buying cycle.

One embodiment of a method may further include generating statistical analytics from customer interest in the display and reporting the statistical analytics to a server. Statistics can also be displayed on most popular product styles, colors, and brands from product sales data within a customer's geographical area. Many customers will be persuaded in their purchase decision at an electronics aisle for instance by knowing which brands, colors, and styles are popular. For example, knowing the popular printer brands, model numbers, and functions may aid a customer in making a purchase decision. Customers looking for product quality endorsement may associate a product's popularity with its quality.

Accessing the customer's gender, race, marital and familial status, estimated age, and body build is included in an embodiment. Such statistical data may be used by product marketers to focus their displays to certain groups of customers. For example, Hispanics are a growing percentage of the consumer force and their disposable income is substantially increasing per capita.

Figure 2:
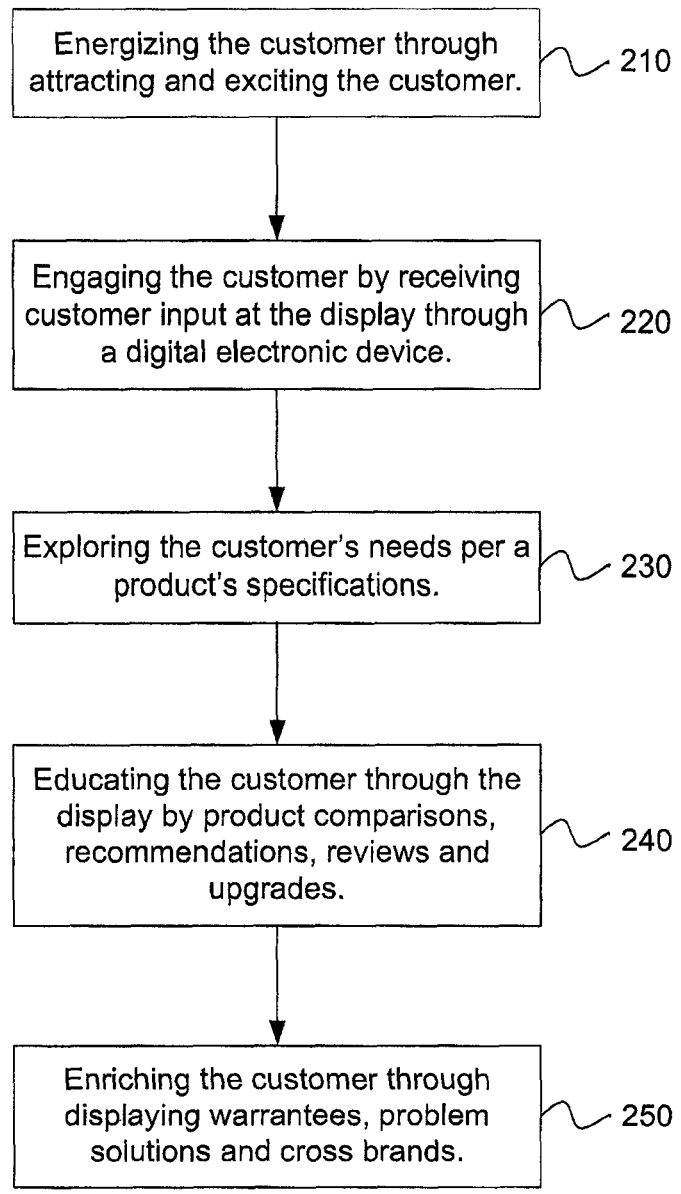
FIG. 2 depicts an embodiment of a method for determining customer stages in a product buying cycle.

FIG. 2 depicts a method, wherein determining the customer's stage in a product buying cycle further includes an operation 210 which energizes the customer by attracting and exciting the customer using the display. The display may do this through dynamic electronic visuals and audio. Also a customer may be attracted by static signage lighting, and aromatic detractors such as scents of pine, and citrus blossoms. The customer may be engaged with the display as in operation 220 by receiving customer input at the display through a digital electronic device such as a touch screen, a keyboard and/or a card swiping device. The customer may explore his or her needs per a product's specifications shown at the display, as in operation 230. The exploring and engaging stages may be actively or passively operated. For example, an interactive display of the product specifications may be through a digital electronic device, as discussed above. On the other hand, passive exploration may be through continuous sensing that a customer or customers are present at and interested in the display.

The display may educate the customer using product comparisons, recommendations, reviews, upgrade descriptions, product demonstrations, videos, and any other available educational or technical material, as in operation 240 in FIG. 2. Comparisons with cross brands may include a product's pricing, quality and durability. Recommendations, reviews and upgrades may include, but are not limited to, favorable press releases, and views of recognized experts in the field of a displayed product. The customer may also be enriched at the display by being shown warrantees, problem solutions and cross brands, as in operation 250. Cross brands are brands of competing products. The display may continue to be changed to a subsequent stage in the buying cycle until a sale is made or until the customer exits from using the display.

Figure 3:
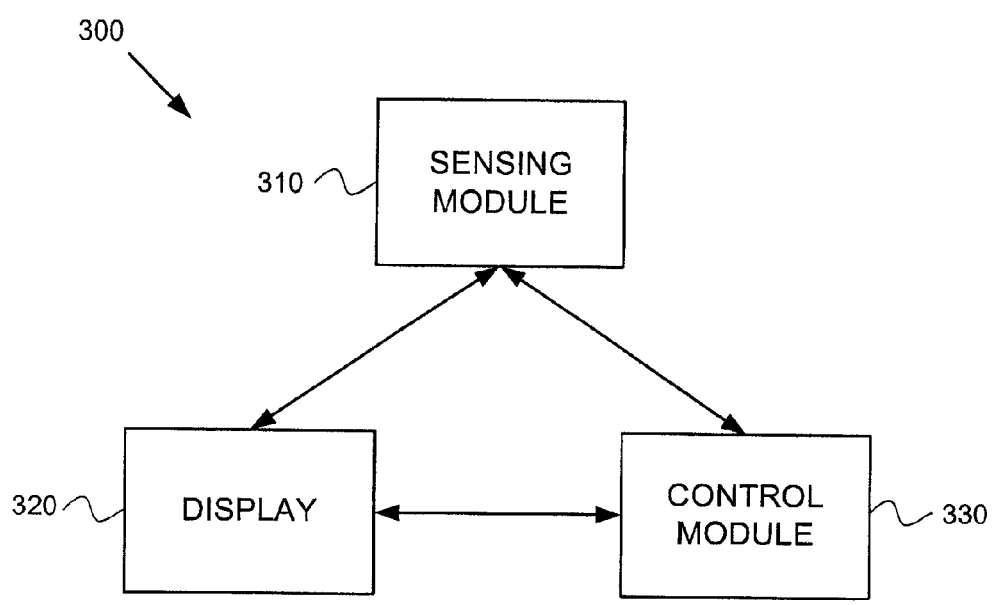
FIG. 3 depicts a virtual sales-assistant device at a product retail location having a product oriented display in accordance with an embodiment.

FIG. 3 depicts a virtual sales-assistant device 300 at a product retail location having a product oriented display. These devices may be located on store shelves, integrated into store shelving, located at aisle end-caps, located in freestanding displays, mounted over product offerings, and even located at entrances to retail stores for example. A sensing module 310 can be configured to determine an amount of time a customer is interested in a displayed product. The sensing module may comprise a digital camera and other subcomponents such as a microphone and even infrared and heat sensors. A display 320 can be coupled to the sensing module and can be configured to display a level of product detail based on the amount of time the consumer is interested in the display. A single line depicting communication between coupled modules and a display is not to be understood as limiting communication to a single medium or to a single carrier within a medium or limiting in any other way. Rather, throughout the disclosure, a single line may include multiple bidirectional signals such as a bus with control in combination with medium such as wired and wireless channels. A control module 330 can be configured to determine a customer's stage in a buying cycle from information received from the sensing module. The control module can also transmit product detail for a customer's subsequent stage in the buying cycle to the display. The control module may comprise digital signal processors and similar subcomponents.

Figure 4:
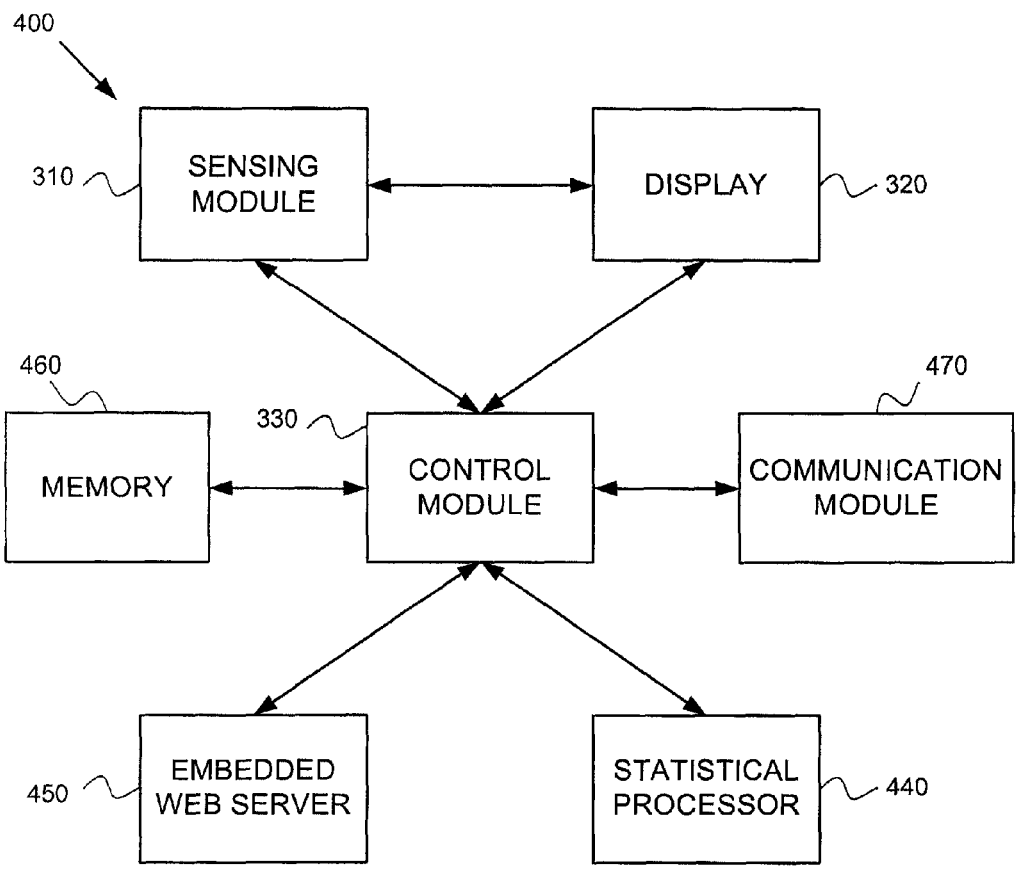
FIG. 4 depicts a virtual sales-assistant device in an alternate embodiment.

FIG. 4 depicts a virtual sales-assistant device 400 in an alternate embodiment. A statistical processing module 440 can be coupled to the control module and configured to generate sales data and analytics. An embedded web server 450 can be in communication with the control module 330 and be configured to communicate the sales data and analytics using a web page over a network. A memory 460 can be coupled to the control module and configured to store the generated sales data analytics. A communication module 470 is coupled to the control module and configured to transfer the generated sales data and analytics to an external device.

Figure 5:
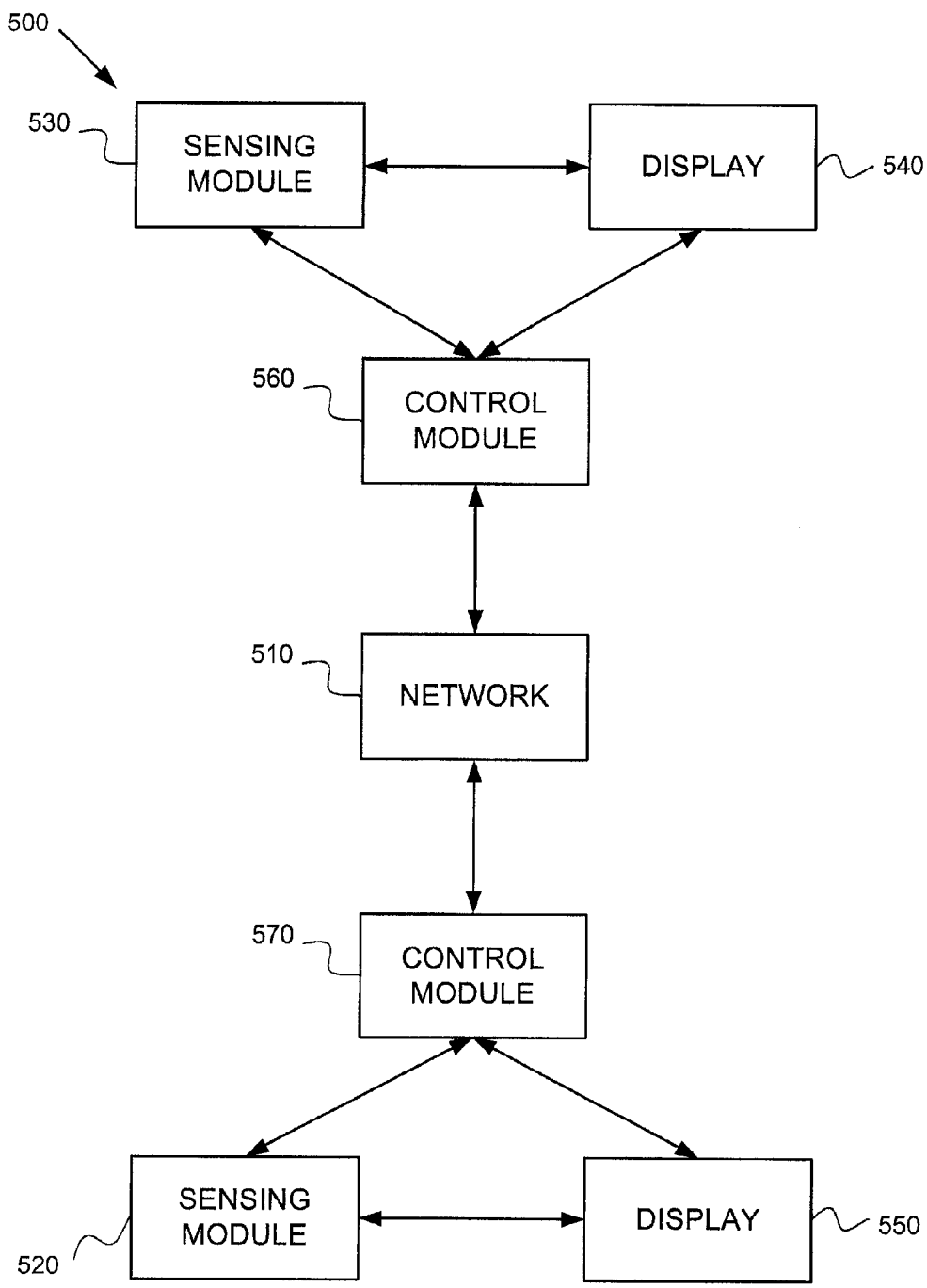
FIG. 5 depicts a virtual sales-assistant system having components at multiple product retail locations in communication with each other over a network in accordance with an embodiment configured to assist customers through a buying cycle.

FIG. 5 depicts a virtual sales-assistant system 500 configured to assist customers through a buying cycle having components at multiple product retail locations in communication with each other over a network 510. However, in an alternate embodiment, multiple components are used at a single retail location to sense customers from multiple vantage points. Such tactically placed components may also communicate with each other over a network. Therefore, sensing modules 520 and 530 can be located at multiple product retail locations or in a single location. The sensing modules are each configured to determine an amount of time a customer at a display is interested in a displayed product. Product displays are located at respective product retail locations such as displays 540 and 550. A display may be dynamic electronic signage, or static electronic signage or any combination thereof. The displays are each coupled to a respective sensing module and are configured to display a level of product detail based on the amount of time a consumer at a display is interested in the display. Control modules such as 560 and 570 at respective product retail locations are in communication with each other over the network. Communication over the network between control modules may require a communication module as depicted in FIG. 4 above. The control modules are each coupled to the network and to a display and a sensing component and are each configured to determine a customer's stage in a buying cycle.

In accordance with an embodiment, a virtual sales-assistant system further includes a processing server connected through the network to the control modules above. The processing server may be configured to generate sales data and analytics. Also a web server may be embedded in the processing server to display the sales data and analytics on a web page over the network.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. A method for electronically assisting a customer, comprising:
    determining, based on measurements from at least one sensor, an amount of time a customer is proximate to a display oriented toward products;
    determining, by a processor, the customer's stage in a product buying cycle based on the amount of time the customer is interested in the display;
    displaying a level of product detail on the display based on the customer's stage in the product buying cycle;
    changing the display to a subsequent stage in the product buying cycle having increased time and interaction between the customer and the display; and
    continuing to display, in response to sensing, based on the measurements from the at least one sensor, that the customer is no longer proximate to the display and that another customer is proximate to the display, a level of product detail on the display based on the customer's current stage in the product buying cycle,
    wherein displaying a level of product detail includes integrating spatial indicators into display information on the display, the spatial indicators indicating location of products described in the display.

2. A method as in claim 1, wherein the sensing the amount of time the customer is proximate to the display includes using techniques selected from the group consisting of facial recognition, eye movement, proximity detection, card swiping, and screen touching.

3. A method as in claim 1, wherein the sensing the amount of time the customer is proximate to the display includes determining the duration of the customer's gaze to the display.

4. A method as in claim 1, wherein the sensing the amount of time the customer is proximate to the display further includes determining the customer's gender, race, marital and familial status, estimated age, and body build.

5. A method as in claim 1, wherein displaying the level of product detail based on the amount of time the consumer is proximate to the display further includes displaying product specifications.

6. A method as in claim 1, wherein the integrating spatial indicators into the display information includes displaying display location relative to the products.

7. A method as in claim 1, further comprising:
    generating statistical analytics from customer interest in the display; and
    storing the statistical analytics to a server.

8. A method as in claim 7, further comprising displaying statistics on most popular products from product sales data within a geographical area determined by the customer.

9. A method as in claim 1, wherein determining the customer's stage in a product buying cycle further comprises:
    attracting and exciting the customer using the display;
    receiving customer input at the display through a digital electronic device;
    exploring the customer's needs per a product's specifications using customer input;
    educating the customer through the display by product comparisons, recommendations, reviews and upgrades; and
    displaying warrantees, problem solutions and cross brands.

10. A method as in claim 9, further comprising changing the display to a subsequent stage in the buying cycle until a sale is made.

11. A method as in claim 9, further comprising changing the display to a subsequent stage in the buying cycle until the customer exits from the display.

12. A virtual sales-assistant device, comprising:
    a sensing module to determine, from measurements from at least one sensor, an amount of time a customer is proximate to a displayed product;
    a display coupled to the sensing module, the display to display a level of product detail based on the amount of time the consumer is proximate to the display; and
    a control module to determine the customer's stage in a buying cycle from information received from the sensing module and to transmit product detail to the display for a customer's subsequent stage in the buying cycle;
    wherein the display is to display spatial indicators of the display location indicating location of products described in the display, and
    wherein in response to sensing, based on the measurements from the at least one sensor, that the customer is no longer proximate to the display and that another customer is proximate to the display, the control module is to continue to display a level of product detail on the display based on the customer's current stage in the product buying cycle.

13. A virtual sales-assistant device as in claim 12, wherein the at least one sensor comprises a digital camera.

14. A virtual sales-assistant device as in claim 12, wherein the at least one sensor comprises at least one infrared heat sensor.

15. A virtual sales-assistant device as in claim 12, further comprising a statistical processing module coupled to the control module to generate sales data and analytics.

16. A virtual sales-assistant device as in claim 15, further comprising an embedded web server coupled to the control module to communicate the sales data and analytics via a web page over a network.

17. A virtual sales-assistant device as in claim 15, further comprising a memory coupled to the control module to store the generated sales data analytics.

18. A virtual sales-assistant device as in claim 15, further comprising a communication module coupled to the control module to transfer the generated sales data and analytics to an external device.

19. A virtual sales-assistant system to assist customers through a buying cycle, comprising:
- at least one display to present a level of product detail based on the amount of time a consumer at a display is interested in the display;
- at least one sensing module, wherein the at least one sensing module is in communication with the at least one display, and the at least one sensing module includes at least one sensor; and
- at least one control module in communication with the at least one display and in communication with the at least one sensing module, the at least one control module to determine a customer's stage in a buying cycle;
- wherein the at least one control module is configured to output on the at least one display spatial indicators indicating location of products described in the at least one display, and
- in response to sensing, based on measurements from the at least one sensor, that the customer is no longer proximate to the display and that another customer is proximate to the display, the control module is to continue to display a level of product detail on the display based on the customer's current stage in the product buying cycle.

20. A virtual sales assistant system as in claim 19, further comprising a processing server in communication with the at least one control module, wherein the processor server is to generate sales data and analytics.

21. A virtual sales assistant system as in claim 20, further comprising a webserver embedded in the processing server for displaying the sales data and analytics on a web page.

* * * * *